Sept. 13, 1949.　　　T. G. JUNGERSEN　　　2,481,757
OPTICAL REFLECTING MATERIAL
Original Filed Feb. 8, 1943
*Fig. 1.*
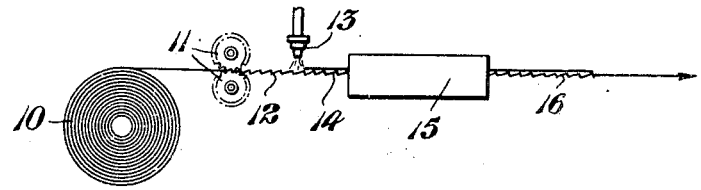
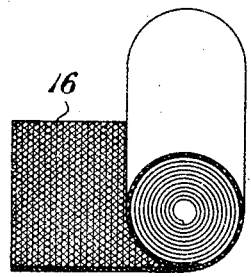
*Fig. 2*
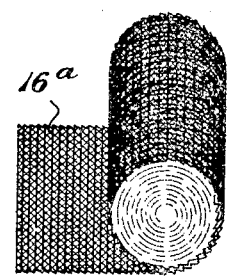
*Fig. 3.*
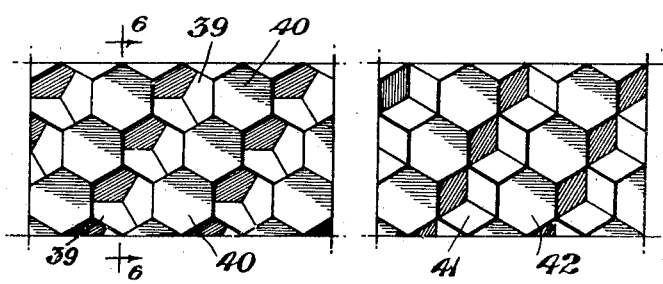
*Fig. 4.*　　　*Fig. 5.*
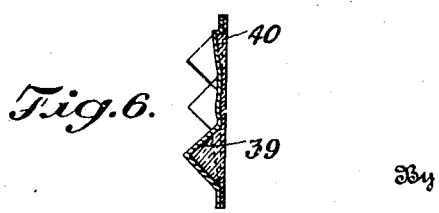
*Fig. 6.*
Inventor
THOGER G. JUNGERSEN
KARL W. FLOCKS
By
Attorney Patented Sept. 13, 1949

2,481,757

UNITED STATES PATENT OFFICE 2,481,757

OPTICAL REFLECTING MATERIAL

Thoger G. Jungersen, Summit, N. J.

Application February 8, 1943, Serial No. 475,155, which is a division of application Serial No. 175,541, November 19, 1937. Divided and this application May 23, 1945, Serial No. 595,342

1 Claim. (Cl. 88—78)

This invention relates to optical material for the reflection of light and more particularly to material capable of reflecting light from a source to a predetermined object or objects.

This application is a division of application Serial No. 475,155, filed February 8, 1943, now Patent 2,380,447, which in turn is a division of application Serial No. 175,541, filed November 19, 1937, which matured as Patent No. 2,310,790, dated February 9, 1943.

Previously known reflectors have been capable of reflecting light from a given source to a particular object, but such reflectors have been delicate, cumbersome, expensive to manufacture, requiring some protecting means, generally not suitable for mass production and hence no wide use of such reflectors is found. A further disadvantage of previously known reflecting means is found in the relatively large size of the parts or design necessary for the solution of particular reflecting problems. Examples of such known reflectors are disclosed in the German patent to Hartman and Jungersen No. 362,136, patented October 24, 1922, and the Danish patent to Norreso No. 33,653, patented September 1, 1924.

Reflectors of the type used today are as a rule fabricated, at least in part, of glass, which is relatively difficult to manufacture into shapes other than those of the simplest form, which is easily broken and is so expensive as to prohibit its use in many instances. Finally, reflectors of this type when broken, lose the function of the entire reflector, perhaps at a time when it is most needed, for wide use of reflectors is made for safety purposes.

It is an object of the present invention to provide reflecting material, capable of reflecting light in accordance with the manner desired, and of such nature as to facilitate its fabrication.

It is a further object to provide a reflecting material having a reflecting surface of particular design.

Other objects and the nature and advantages of the invention will be apparent from the following description taken in conjunction with the accompanying drawings, wherein:

Figure 1 is a schematic showing of a process for the formation of flexible sheet material bearing a reflecting surface in accordance with the laws of optics;

Fig. 2 is a perspective view of a roll of such flexible reflecting material;

Fig. 3 is a view in perspective of a roll of reflecting material in accordance with the invention;

Fig. 4 is an enlarged plan view of a portion of a reflecting surface in accordance with the invention;

Fig. 5 is a view similar to Figure 4 but showing a modified form of reflecting surface; and Fig. 6 is a view in section taken along line 6—6 of Fig. 4.

Referring to Fig. 1, a roll of flexible material 10, such as for example, paper, fabric or metal or an organic material such as a cellulose derivative or other organic or inorganic materials, may be fed through forming rollers 11 with or without the application of pressure or heat which impress upon the sheet material the proper optical surface. The now "formed" material 12 may be then "filled-in" by spray nozzle 13 or other suitable means with a transparent flexible material, such as, for example, a cellulose derivative or other suitable organic or inorganic material. The "filled-in" material 14 may then be passed through a chamber 15 wherein the filling may be dried or otherwise treated whereby it may present a proper surface on its exterior and form a suitable bond between it and the flexible materials base. The finished material which may or may not be flexible, having a protected reflecting surface of proper optical design 16 may then emerge from the treating chamber 15 and may be rolled as shown in Fig. 2 or cut to various sizes or shapes for different purposes.

In Figure 3 a roll of reflecting material 16a is shown which may merely comprise sheet metal formed in accordance with the laws of optics to present a reflecting surface operative to reflect light in a desired predetermined manner. It is to be understood that the embodiments illustrated in Figs. 1 to 5 inclusive, may similarly comprise a single element.

It is often desirable to utilize a reflecting surface which will be effective to reflect light from different sources at various times when said sources are available to an object or objects more or less constantly located so far as the reflection of light is concerned. For example, such reflecting surface may be effectively utilized on a sign which has to be read both in the day time by light from the sky and at night by light originating from the object itself or close by. Such reflecting surfaces are depicted in Figs. 4 and 5, respectively. The reflecting surface shown in Fig. 4 comprises a series of reflecting units 39, which may be similar to the reflecting units 27 shown in Fig. 6 of copending application Serial No. 475,155 and Fig. 6 of Patent No. 2,310,790, and a series of reflecting units 40, arranged as shown, having a generally hexagonal outline and a tilted plane or slightly curved surface similar to those of facets 19 of the reflecting material shown in Fig. 3 of copending application Serial No. 475,155 and Fig. 3 of Patent No. 2,310,790.

The reflecting units 39 operate to reflect light back to a source and may be effectively used at night, for example to reflect light from the headlights of automobiles back to their drivers. The reflecting units 40 are arranged to reflect light from another source, for example, the sky, whereby the same sign which is utilized to reflect light from the headlamps of an automobile back to its driver may be utilized in the day time to reflect light from the sky to the same driver. In Fig. 5, the reflecting units 41 operate to reflect light back to its source and perform a function similar to the reflecting units 39. In this figure the reflecting units 42 are similar to the reflecting units 40 in Fig. 4 and perform a similar function. The relative size of the reflecting units may be much smaller than that shown in the drawing and they may be fabricated in a manner similar to that utilized in connection with the embodiments shown in Figures 3 to 9 inclusive of copending application Serial No. 475,155 and Figures 3 to 9 inculsive of Patent No. 2,310,790. The finished reflector may be flexible, easily cut, stamped out into required shapes for use in various places for safety signals, signs, illumination, decorations, etc. The facets may occur as often as ten or even one hundred to the inch.

The different types of reflecting units in each of the modifications shown in Figs. 4 and 5 may be arranged in alternate rows as shown in Figs. 4 and 5, or in other geometrical designs, or they may be heterogeneously dispersed throughout the entire reflecting surface, or they may be arranged in accordance with a scheme or plan to reflect one particular sign during the day and another during the night. For example, the day units may be arranged on the reflecting surface to spell out the word "open" and similarly the units which reflect light back to the source may be arranged to spell out the word "closed."

The invention is capable of an extremely wide use by reason of its simplicity both in manufacture and as regards its utilization. It is easily manufactured from inexpensive materials and in any size, and, in fact, sizes so small that the particular design of each reflecting unit or facet is unnoticeable. When the material is so made, it is obviously capable of uses that larger reflectors are incapable of. For example, where portions of the reflecting material are blocked or cut out to form a certain pattern or letter, the effect of a definite outline is not obtained unless the relative sizes of the reflecting units to the design of the outline is such as to make the design of each reflecting unit insignificant. Reflection from reflectors, in accordance with my invention, in contrast to that from known forms, is even, pleasing and generally more satisfactory.

It is contemplated that the finished reflecting material be of such nature that it may be easily cut to predetermined shape with simple tools, for example as by a pair of shears or knife. It is also capable of being produced in predetermined shapes in mass quantities by stamping means or other methods. The reflecting material may have one or both of its surfaces covered with an adhesive whereby it may be easily secured to other surfaces directly from the roll of reflecting material or it may be applied to a surface in a manner similar to the attachment of wall paper to a wall by an interior decorator; that is, by the application of a paste or other similar material to the wall surface and the subsequent application of the sheet reflecting material thereto. It is further contemplated that the reflecting surface of the sheet material be preferably of a plastic material such as may not be easily injured or if it be injured the remainder or uninjured portion of the reflector may not be rendered ineffective.

The plastic substance on the surface of the reflecting material may not only function as a protecting medium therefor but it may serve as a refracting medium definitely directing the rays of light in accordance with the laws of optics in a manner predetermined by the design and nature of the material itself. Not only may the material be fastened or secured to a surface by the use of a frame or by utilizing an adhesive, but it is of such a nature that it may easily be nailed or screwed to any surface.

It will be seen from the above that applicant has ingeniously devised a reflecting material capable of many uses in different manners and of such a simple nature whereby it may be fabricated of the simplest and least inexpensive materials and installed or secured with the simplest of tools. It is to be understood that where I have used the expression "relatively shallow substantially contiguous facets" or an equivalent expression in the claim, that the word "shallow" is not to be construed as being shallow with respect to the thickness of the sheet reflector but simply meaning not so deep as to make the reflecting material so thick as to prevent its flexing. This will perhaps be better understood if reference is made to the drawings wherein the facets are disclosed as being almost as deep as the thickness of the sheet material.

It will be obvious to those skilled in the art that various changes may be made in my device without departing from the spirit of the invention and therefore I do not limit myself to what is shown in the drawings and described in the specification but only as indicated in the appended claim.

What I claim is:

A relatively large flexible sheet reflector having indentations formed on one of its surfaces in accordance with the laws of optics to reflect light, some of said indentations being formed to reflect light from the sky in a generally horizontal direction when the flexible sheet reflector is in a generally vertical plane, said indentations comprising inclined plane reflecting surfaces, and a second set of indentations formed on said surface and designed to reflect light in the general direction of a second source of light so as to produce an autocollimating effect, said second set of indentations each comprising three plane surfaces each of which are at right angles to the other, all of said indentations being of such relatively small size as compared with the outlines of said sheet that the general outlines of said sheet will not appear substantially disfigured to an observer at relatively close range, the reflecting units formed by the said indentations being of such design as to reflect substantially all the light transmitted to them from a light source, the depth of the units being very small and ranging in size up to approximately one tenth of an inch.

THOGER G. JUNGERSEN.

(References on following page)

REFERENCES CITED

The following references are of record in the file of this patent:

UNITED STATES PATENTS

| Number | Name | Date |
|---|---|---|
| 285,270 | Jaeger | Sept. 18, 1883 |
| 1,562,835 | Kuttler | Nov. 24, 1925 |
| 1,858,975 | Ta'Bois | May 17, 1932 |
| 1,950,560 | Martinek et al. | Mar. 13, 1934 |
| 2,043,690 | Arbuckle et al. | June 9, 1936 |
| 2,123,478 | Smith | July 12, 1938 |
| 2,167,149 | Grote | July 25, 1939 |
| 2,170,874 | Ryder | Aug. 29, 1939 |
| 2,205,638 | Stimson | June 25, 1940 |
| 2,275,824 | Kirkpatrick | Mar. 10, 1942 |
| 2,310,790 | Jungersen | Feb. 9, 1943 |

FOREIGN PATENTS

| Number | Country | Date |
|---|---|---|
| 609,270 | France | May 8, 1926 |
| 511,107 | Germany | Oct. 25, 1930 |
| 341,179 | Great Britain | Jan. 15, 1931 |
| 752,949 | France | July 31, 1933 |
| 438,236 | Great Britain | Nov. 13, 1935 |